Patented Mar. 7, 1944

2,343,536

UNITED STATES PATENT OFFICE 2,343,536

PURIFICATION OF MALEIC ANHYDRIDE

Joyce H. Crowell, Orchard Park, N. Y., assignor to Allied Chemical & Dye Corporation, a corporation of New York No Drawing. Application June 6, 1941,
Serial No. 396,869

15 Claims. (Cl. 260—342.6)

This invention relates to purification of maleic anhydride and particularly to a method for refining maleic anhydride produced by catalytic vapor phase oxidation and containing colored and/or color-forming impurities.

In the catalytic vapor phase partial oxidation of organic compounds, such as, for example, benzene, methylnaphthalene, phenol, cresol, benzophenone, furane, diphenyl, toluene, butene, furfural, and naphthalene, to produce maleic anhydride, various methods for recovering maleic anhydride from the gaseous reaction mixtures resulting from such processes have been employed; for example, the gases have been subjected to controlled preliminary cooling to effect a partial condensation therefrom of maleic anhydride before further treatment of the gases to effect removal of remaining condensible vapors; or the gases have been conducted through an organic solvent to absorb maleic anhydride and the anhydride then has been recovered from the resulting solvent solution, as described in United States Patent 2,140,140; or the gases have been conducted into water to form an aqueous solution of maleic acid from which the acid has been recovered and converted to maleic anhydride by a dehydration process such as that described in United States Patent 1,966,853 or that described in United States Patent 2,205,402. Maleic anhydride recovered by some methods is very dark; that recovered by others is less so; but an attribute common to all such products is the presence therein of colored and/or color-forming impurities.

Hereinafter, in the specification and in the claims, maleic anhydride which contains colored or color-forming impurities to be removed will be termed "crude maleic anhydride," and colored and color-forming impurities will be designated generically by the term "chromogenic impurities."

While it might be presumed that processes applicable to the removal of chromogenic impurities which are present in crude phthalic anhydride obtained from the catalytic vapor phase partial oxidation of organic compounds, e. g., naphthalene, should be suitable also for the purification of crude maleic anhydride, such has not been found to be the case. Thus, while a treatment with sulfuric acid at high temperature followed by distillation to recover the purified product has been employed successfully to produce colorless phthalic anhydride products which are surprisingly stable, and remain colorless for long periods of time, the same process when applied to crude maleic anhydride has been found to produce products which are only temporarily colorless.

In the past, it has been proposed as a laboratory procedure, to produce maleic anhydride by mixing maleic acid with about 70% of its weight of phosphorus pentoxide and vacuum-distilling the mixture, and then to purify the anhydride by recrystallization from chloroform. The application of this process to the manufacture of maleic anhydride would obviously add materially to the cost of the product.

In my United States Patent 2,129,166 of September 6, 1938, I have described a process for purifying maleic anhydride, which comprises maintaining the anhydride at an elevated temperature for a sufficient time to convert chromogenic impurities to products differing greatly in volatility from the anhydride, and separating the anhydride and reaction products by volatilization. This "aging" process accomplishes an effective purification, but when a product characterized by a commercially acceptable standard of color is required from a not particularly good grade of crude maleic anhydride, it entails heating for so many hours that the process becomes an excessive burden to maintenance of low production costs.

The present invention is in the nature of an improvement over and upon the hot-aging process of my United States Patent 2,129,166.

Objects of the present invention are to provide a more rapid method of purifying crude maleic anhydride than methods hitherto available, and to effect more complete purification of crude maleic anhydride and thereby produce a purified maleic anhydride product distinguished by its unusual stability to the development of color.

In accordance with the present invention, crude maleic anhydride is subjected to a hot-aging in liquid phase in contact with an oxygen-containing acid of phosphorus, arsenic, or antimony, or with an anhydride or salt of such an acid, to convert the chromogenic impurities contained in the crude maleic anhydride to products which are relatively non-volatile compared with maleic anhydride, and maleic anhydride is separated from such products by fractional distillation.

The process of the present invention accomplishes the purification of even refractory types of crude maleic anhydride rapidly and at relatively low temperatures, and produces from highly impure and highly colored grades of crude maleic anhydride excellent yields of purified maleic anhydride characterized by excellent color and stability to development of color during storage.

The crude maleic anhydride may be treated either alone in molten condition or in the form of a solution in an organic solvent which is inert to the maleic anhydride and to the reagent employed. As examples of solutions may be mentioned solvent naphtha solutions or chlor-naphthalene solutions containing from 50% to 70% by weight of maleic anhydride.

Pressure, aside from its effect upon the boiling point of maleic anhydride, is substantially without effect on the present treatment, and the process may be carried out under superatmospheric, normal, or reduced pressure under otherwise like conditions with substantially identical results.

The mixture of maleic anhydride and purifying reagent may be maintained at the selected treatment temperature until the mixture or a sample thereof brought to its refluxing temperature under the pressure at which the distillation is to be effected, produces a distillate or reflux condensate, the color of which is equal to or better than a desired color standard. The mass then may be subjected to distillation to obtain a very high yield of purified maleic anhydride of the desired color standard. However, the stability of the product towards development of color may be further improved by prolonging the hot-aging period beyond the minimum time required to attain the desired color of distillate. Hence the hot-aging may be regulated to provide the desired degree of stability.

I have found that with otherwise like conditions, to effect a particular degree of purification in a particular mixture of molten maleic anhydride and a purifying reagent of the type hereinbefore described, the necessary period of treatment diminishes as the temperature of treatment is increased.

In general, with other conditions equal, an increase in the amount of the reagent employed permits a reduction in the time required to effect a commensurate purification. On the other hand, with the addition of an amount of solid reagent such as $P_2O_5$ greater than 30% of the crude maleic anhydride, it has been found difficult to maintain the mixture as a homogeneous mass; and when such a mixture is distilled, this lack of homogeneity appears to cause an impairment of heat transfer which results in excessive decomposition and loss of yield of refined maleic anhydride.

It is preferable to employ an amount of purifying agent not exceeding about 10% by weight of the crude maleic anhydride.

Examples of suitable compounds for effecting the purification are phosphorus-pentoxide, phosphoric acid, aluminum phosphate, meta phosphoric acid, pyrophosphoric acid, phosphorus trioxide, phosphorous acid, phosphorus tetroxide, hypophosphoric acid, arsenic trioxide, arsenic pentoxide, antimony trioxide, and antimony pentoxide.

I prefer the phosphorus-oxygen compounds, especially phosphorus pentoxide, which I have found to be the most powerful of the aforesaid group of purifying agents, and to effect the purification of crude maleic anhydride more rapidly than the other compounds of the group. By use of the preferred compounds it is possible to produce, from very crude types of maleic anhydride, highly purified maleic anhydride which is distinguished by a lightness of color, and a stability to development of further color on standing, which have not been attained by hitherto known purification methods.

When the crude maleic anhydride to be treated contains free water or maleic acid, the crude product is preferably dehydrated by rectification prior to applying the purification treatment.

The purification treatment of a crude maleic anhydride which contains only a small proportion of chromogenic impurities may be effected by mixing the molten maleic anhydride with the purifying reagent, agitating the mixture for a short time, for example 10 minutes, at a temperature above the melting point of the maleic anhydride, and thereupon distilling the mixture.

However, when the crude maleic anhydride is contaminated by a relatively large content of chromogenic impurities, a short treatment with the purifying reagent may be insufficient to produce more than a small recovery of maleic anhydride exhibiting a commercially acceptable standard of color or stability towards development of color during storage. In such cases, the first part of the distillate may contain excessive proportions of chromogenic impurities, while as the distillation proceeds and thus prolongs the duration of action of the purifying agent on the crude maleic anhydride, more extensive purification takes place and the distillate becomes progressively lighter and in general has a decreasing tendency to develop color during storage. Thus, a late portion of the distillate may be actually satisfactory in color and stability to development of color on standing, but the yield of acceptable maleic anhydride so obtained may be comparatively small. Hence in the treatment of such refractory crude maleic anhydride products the crude is heated in the presence of the purifying reagent for at least 3 hours and usually considerably longer prior to distillation of maleic anhydride.

A good grade of crude maleic anhydride which is intermingled with a limited quantity of phosphorus pentoxide can be purified to produce a distillate of a commercial standard of "whiteness" by maintaining the mixture before distillation at a suitable temperature, for example, at 150° C., for about one tenth the time necessary to effect the same degree of decolorization employing an aging treatment in the absence of the phosphorus pentoxide at the same temperature; and, in general, stability against development of color during storage of the purified maleic anhydride obtained with the aid of the treatment with phosphorus pentoxide is greater than that of the maleic anhydride purified by the aging treatment without the aid of the phosphorus pentoxide.

As compared with the periods of treatment required to attain a specific purifying effect with a phosphorus compound, the periods of treatment required to effect the same purifying effect with compounds of arsenic and antimony are longer.

Preferably the aging treatment is conducted at temperatures between 140° C. and 200° C.

The following examples further illustrate the purification process of the present invention. In these examples, deviation from colorlessness of the shade of the purified maleic anhydride in the molten state is expressed in terms of a scale of color standards wherein each color standard bears a number which is synonymous with the shade of a specific dilution of a stock aqueous solution of potassium chlorplatinate and cobalt chloride. The stock solution is prepared by adding 100 cc. of concentrated hydrochloric acid to a solution of 1.246 grams of potassium chlorplatinate ($K_2PtCl_6$), corresponding to 0.50 gram of platinum, and 1.00 gram of cobalt chloride hexahydrate ($CoCl_2.6H_2O$), corresponding to 0.25 gram of cobalt, in distilled water, and diluting the resulting solution with distilled water to a volume of one liter. The stock solution thus prepared is given a color number of 500 and the remaining color numbers of the scale are ascribed to solutions obtained by specific degrees of dilution of the stock solution as follows:

| Color number | Dilution (parts by volume of distilled water per part of stock solution) |
|---|---|
| 10 | 49 |
| 20 | 24 |
| 40 | 11.50 |
| 60 | 7.30 |
| 80 | 5.25 |
| 100 | 4.00 |
| 150 | 2.33 |
| 200 | 1.50 |
| 300 | 0.67 |
| 400 | 0.25 |
| 500 | 0.00 |

To determine the color number of a purified maleic anhydride, a molten sample of the latter is compared, under substantially identical conditions, with standard solutions which correspond to those identified by the numbers in the foregoing color scale; the number of the solution whose color is most closely approximated by the color of the molten anhydride is said to be the color number of the latter.

In the following examples "parts" signifies parts by weight.

*Example 1.*—4500 parts of crude maleic anhydride obtained by directly condensing the major part of the maleic anhydride in the absence of solvents from the gaseous reaction products of catalytic air oxidation of benzene, were mixed with about 45 parts of phosphorus pentoxide and heated between 150° and 160° C. at 200 mm. of mercury absolute pressure for about ten hours under reflux. After this period of heating a sample of the reflux condensate was found to have a color number less than 20. The molten mass was then distilled at an absolute pressure of 25 to 50 mm. of mercury. The collected distillate had a color number not exceeding 40. After exposure to daylight for three calendar months, the product still possessed a color number not exceeding 40.

*Example 2.*—Crude maleic anhydride obtained by direct partial condensation in the absence of solvents, from the hot reaction gases produced by catalytic air oxidation of benzene was refluxed in a glass still fitted with a reflux condenser until no further water distilled off from the product.

150 parts of the dehydrated crude maleic anhydride thus obtained were mixed with 1.6 parts of phosphorus pentoxide and aged with agitation at atmospheric pressure for ten hours at 150° to 160° C. 138 parts of the resulting mass were transferred to a glass distillation vessel and fractionally distilled at an absolute pressure of 60-70 mm. of mercury yielding 121 parts of distillate having a setting point of 52.8° C.

The same amount of dehydrated crude maleic anhydride obtained from the same sample of crude anhydride was aged alone under otherwise like conditions. 88 parts of the resulting mass were transferred to a glass distillation vessel and fractionally distilled under a pressure of 60-70 mm. of mercury absolute. 66 parts of distillate having a setting point of 52.6° C. were obtained. At the same temperature, the color number of the distillate in molten phase purified with $P_2O_5$ was 10; while the color number of the distillate purified without $P_2O_5$ was much darker than 500. The maleic anhydride purified with $P_2O_5$, after standing exposed to ordinary room daylight (out of direct sunlight) for 240 days, possessed a color number of 30.

*Example 3.*—Of two like quantities of crude dehydrated maleic anhydride obtained as in the preceding example, one was agitated with 1% of its weight of $P_2O_5$ at a temperature of 150° to 160° C. at atmospheric pressure for ten hours in an iron vessel. 188 parts of the resulting mass were transferred to a glass distillation vessel and fractionally distilled at an absolute pressure of 150 mm. of mercury. 185 parts of maleic anhydride distillate having a color number of 10 were obtained. After 225 days exposure to ordinary daylight, the color number of the distillate was 30.

The other quantity of the crude dehydrated maleic anhydride was heated alone for 90 hours under conditions otherwise the same and 197 parts of the mass thus obtained were transferred to a glass distillation vessel and fractionally distilled at an absolute pressure of 150 mm. of mercury. 176 parts of maleic anhydride distillate having a color number of 20 were obtained. After standing in ordinary daylight for about 60 days, this distillate had a color number of about 40.

*Example 4.*—Four portions of the same crude dehydrated maleic anhydride obtained as described in Example 2 by catalytic oxidation of benzene, the first portion being mixed with 1% of its weight of phosphoric acid, the second with 1% by weight of aluminum phosphate, and the third with 1% by weight of phosphorus pentoxide, were heated separately in glass vessels with agitation at 150° to 160° C. and under atmospheric pressure for about four hours. Each resulting mass was separately transferred into a glass distillation flask, and fractionally distilled under an absolute pressure of 60-70 mm. of mercury.

A control run was conducted using the same type of crude maleic anhydride alone but under otherwise like conditions, and fractionally distilling the resulting mass at an absolute pressure of 60-70 mm. of mercury.

The maleic anhydride distillates, all of which had setting points between 52.6 and 52.8° C., were permitted to stand in ordinary room daylight and their colors were determined initially, after 20 days, and after 50 days.

The following table gives the results:

| Reagent | Parts by weight of— | | | Color of distillate | | |
|---|---|---|---|---|---|---|
| | Distilland | Distillate | Residue | Initial | After 20 days | After 50 days |
| $H_3PO_4$ | 98 | 82 | 16 | 0 | 20 | 20 |
| $AlPO_4$ | 99 | 74 | 25 | 0 | 40 | |
| $P_2O_5$ | 98 | 77 | 20 | 0 | 10 | 10 |
| Control | 99 | 83 | 16 | 100 | 300 | |

*Example 5.*—In the catalytic vapor phase air oxidation of naphthalene to phthalic anhydride, the gaseous reaction mixture contains not only phthalic anhydride but also smaller amounts of maleic anhydride and other by-products such as naphthoquinone. After condensation of phthalic anhydride from the gaseous product, the maleic anhydride may be scrubbed from the tail gas by means of water. From the resulting liquor containing maleic acid, phthalic acid, and naphthoquinone, crude maleic acid may be recovered by boiling the liquor with animal charcoal to partially purify it, filtering the slurry, cooling the filtrate to cause the phthalic acid therein to crystallize, separating the phthalic acid crystals as a cake by filtration, concentrating this filtrate by evaporation, cooling it to cause the maleic acid therein to crystallize, and separating the maleic acid crystals as a cake by filtration. This maleic acid may be dehydrated to produce maleic anhydride, for example by thermal decomposition into a mixture of vapors of maleic anhydride and water, and fractional condensation therefrom of the anhydride. The crude by-product maleic anhydride thus obtained contains chromogenic impurities.

172 parts of a crude maleic anhyride of this type were heated with 1.72 parts of $P_2O_5$ at 160° to 165° C. at atmospheric pressure for about seven hours with agitation. The resulting mass was distilled to dryness at an absolute pressure of about 60 mm. of mercury and thereby 164 parts of distillate having a setting point of 52.6° C. were produced. An equal weight of the same crude maleic anhydride was heated without $P_2O_5$ under conditions otherwise identical and the resulting mass was distilled to dryness at an absolute pressure of about 60 mm. of mercury. 162 parts of distillate having a setting point of 52.2° C. were obtained.

The following table shows a comparison of the color numbers of the two distillates on standing in glass bottles in ordinary daylight.

| Time of standing (in days) | Color of distillate | |
| --- | --- | --- |
| | Treatment with $P_2O_5$ | Treatment without $P_2O_5$ |
| 0 | 0–10 | 20 |
| 14 | 0–10 | 40 |
| 28 | 40 | 60 |
| 72 | 60 | 80 |

*Example 6.*—A maleic anhydride condensate obtained by frictionally cooling the hot gaseous reaction mixture from catalytic vapor phase air oxidation of furfural was refluxed at an absolute pressure of 160 mm. of mercury to expel the small proportion of water present as maleic acid. 58 parts of the crude dehydrated anhydride were heated with 0.6 part of $P_2O_5$ for seven hours at 160° to 165° C. at atmospheric pressure with agitation. The resulting mass was distilled at an absolute pressure of 60 mm. of mercury. 39 parts of distillate having a setting point of 52.6° C. were obtained.

An equal amount of the same crude hydrated maleic anhydride was treated without the $P_2O_5$ but under otherwise like conditions and the resulting product was distilled as before, yielding 47 parts of distillate of 52.5° C. setting point.

The following table shows a comparison of the color numbers of the two distillates on standing in glass bottles in ordinary indoor daylight.

| Time of standing (in days) | Color of distillate | |
| --- | --- | --- |
| | Treatment with $P_2O_5$ | Treatment without $P_2O_5$ |
| 0 | 10 | 20 |
| 13 | 10–20 | 40 |
| 25 | 10–20 | 40 |
| 55 | 10–20 | 40 |

*Example 7.*—125 parts of crude maleic anhydride, which was obtained by passing the reaction products from the catalytic vapor phase oxidation of benzene by means of air into contact with solvent naphtha in the manner described in United States Patent 2,140,140, and fractionally distilling the resulting solvent naphtha solution of maleic anhydride to expel the solvent naphtha and water, were mixed with about 12.5 parts of arsenic trioxide ($As_2O_3$). The mixture was fractionally distilled in a glass vessel at atmospheric pressure during about 15 minutes to form two fractions. The first fraction, amounting to about 10 parts, was collected separately as a lights cut; the second fraction, which amounted to about 70 parts, represented the main fraction of purified maleic anhydride distillate. This main fraction was only slightly yellow in color.

A similar distillation was made of a mixture of 125 parts of the same type of crude maleic anhydride and 12.5 parts of antimony trioxide ($Sb_2O_3$). The main distillate of purified maleic anhydride, about 77 parts, was slightly yellow in color and slightly more colored than the main fraction obtained from the mixture containing arsenic trioxide.

A control run was conducted wherein the same type of crude maleic anhydride was fractionally distilled alone under like conditions to form two fractions, a "lights" fraction and a main fraction, about 10 parts and about 70 parts, respectively. The main fraction was substantially orange in color, that is to say, much more colored than the main fractions from the treatments with arsenic and antimony trioxides.

Oxygen-containing acids or salts of such acids of arsenic and antimony may be substituted for the arsenic trioxide and antimony trioxide. However, the salts are less effective than the corresponding free acids or their anhydrides and in a corresponding treatment period do not produce a product of as good color.

The present purification process may be applied to crude maleic anhydride which has been previously purified according to other purification treatments. Thus, it is possible to effect a purification of crude maleic anhydride by partially aging it in the absence of a reagent such as a phosphorus oxygen compound and to complete the purification by aging it in the presence of such a compound.

The following test demonstrates the effect of partial treatment with and partial treatment without the reagent.

*Example 8.*—Six samples of approximately equal weight of crude dehydrated maleic anhydride obtained as described in Example 2 were aged by heating them for ten hours at about 155° C. at atmospheric pressure. To each of Samples 1 to 5, inclusive, 1% of its weight of $P_2O_5$ was added; but the time at which the addition of $P_2O_5$ was made varied among said samples in the following manner:

The $P_2O_5$ was added to Sample 1, two hours after start of aging; to Sample 2, four hours after start of aging; to Sample 3, six hours after start of aging; to Sample 4, eight hours after start of aging; to Sample 5, 9½ hours after start of aging. To Sample 6, no $P_2O_5$ was added.

Each sample was distilled in vacuo to produce in each case about the same weight of distillate of refined maleic anhydride. All of the distillates had solidifying points between 52.6° and 52.8° C. The distillates were exposed in glass bottles to ordinary room daylight. The following table shows the observed color numbers of the respective distillates.

| Distillate sample No. | Duration of P2O5 treatment in hours | Color number | | | | |
|---|---|---|---|---|---|---|
| | | Initial | After 20 days | After 50 days | After 80 days | After 100 days |
| 1 | 8 | 10 | 20 | 10 | 10 | |
| 2 | 6 | 20 | 30 | 20 | 20 | |
| 3 | 4 | 20 | 60 | 80 | 80 | 80 |
| 4 | 2 | 20 | 60 | 80 | 90 | 90 |
| 5 | 0.5 | 20 | 80 | 100 | 100 | (1) |
| 6 | 0 | 500+ | | | | |

¹Darker than 100.

Since a color number of 40 is highly satisfactory for most purposes, the test indicates that in order to attain a satisfactory color in a ten-hour aging treatment of the crude tested, at 155° C., the $P_2O_5$ should be present for not less than six hours.

An advantage of the purification treatment of the present invention is that it permits a more economical commercial manufacture of purified maleic anhydride than hitherto known methods. This advantage of the process of the present invention in large scale commercial applications is illustrated by Examples 9 and 10 below, which show that by means of a single purification treatment with $P_2O_5$, including fractional distillation to dryness to recover the purified product, all of the distillate of purified maleic anhydride can be obtained as material which is characterized by a faint color having an intensity which does not exceed a commercially acceptable arbitrary value; whereas by means of a single similar treatment without $P_2O_5$, while the total resulting distillate of purified maleic anhydride is not substantially different in amount from that recovered in the $P_2O_5$ treatment, only a portion thereof can be obtained as material having a color which does not exceed in intensity the same value.

*Example 9.*—Crude maleic anhydride, which was obtained by catalytic vapor phase air oxidation of benzene as described in Example 7, and from which solvent naphtha and water had been completely removed by distillation, was aged by heating it alone in a still at about 160° C. for about 60 hours and thereafter heating it with about 4% of its weight of $P_2O_5$ at the same temperature for about 10 hours. The aged batch was distilled to dryness. The resulting distillate, which represented the purified maleic anhydride product, amounted to about 86% by weight of the initial crude material, and no part of it had a color in excess of color number 30 in the Pt-Co scale defined above.

When the crude dehydrated maleic anhydride was aged by heating it in the absence of $P_2O_5$ at about 160° C. for about 70 hours, and the aged batch was fractionally distilled to dryness, the total resulting distillate of maleic anhydride corresponded to about 93% by weight of the initial crude material, but only a fraction representing about 40% of this distillate was material which had a color not in excess of color number 65 on the Pt-Co scale. The remaining distillate had a color in excess of color number 65 on the Pt-Co scale.

A further portion of purified maleic anhydride having a color number not in excess of 65 on the Pt-Co scale may be obtained by submitting the more highly colored portion of the foregoing distillate to an additional aging and distillation treatment.

*Example 10.*—Crude anhydrous maleic anhydride was obtained in the following manner.

Crude maleic acid crystals were prepared by concentrating by evaporation, and subsequently crystallizing a crude aqueous solution of maleic acid which was obtained in conventional manner by scrubbing with water the gases and vapors leaving a converter in which benzene was being catalytically oxidized in vapor phase with air to form maleic anhydride. The crude crystals were thermally decomposed into vapors of maleic anhydride and water from which a crude maleic anhydride product containing more than about 90% by weight of maleic anhydride together with impurities, including a small amount of water, which was probably present as maleic acid, was obtained by fractional condensation in a manner similar to that described in Example 3 of U. S. Patent No. 2,205,402. Water contained as such or as maleic acid in the crude maleic anhydride thus obtained was completely removed by rectification under reflux.

The resulting crude anhydrous maleic anhydride was aged by heating it with about 1% of its weight of $P_2O_5$ at about 160° C. for about 10 hours. The aged batch was distilled to dryness. The resulting distillate representing purified maleic anhydride amounted to about 93% by weight of the initial crude material, and no part of it had a color in excess of color number 20 in the Pt-Co scale.

When the crude anhydrous maleic anhydride was aged by heating it without $P_2O_5$ at about 160° C. for about 10 hours, and the aged batch was distilled to dryness, the total resulting distillate of maleic anhydride corresponded to about 93% by weight of the initial crude material, but a condensate fraction representing only about 85% of the total distillate was material which had a color not in excess of color number 25 on the Pt-Co scale. The remaining distillate had a color in excess of color number 25 on the Pt-Co scale.

I claim:

1. In the hot-aging treatment of maleic anhydride wherein a crude molten mass of maleic anhydride containing chromogenic impurities is maintained at a temperature above the melting point of maleic anhydride for a period of time long enough to convert chromogenic impurities to by-products whose vapor pressures are substantially different from the vapor pressure of maleic anhydride and thereafter a refined maleic anhydride of a lower color number as compared with the color number of said crude maleic anhydride prior to the hot-aging treatment is separated from said by-products by fractionation, that improvement which comprises having present in the molten maleic anhydride while it is subjected to said hot-aging treatment a compound of the group consisting of the oxy acids and oxy acid anhydrides of phosphorus, arsenic and antimony in a limited amount which is less than 30% of the crude maleic anhydride.

2. In the hot-aging treatment of maleic anhydride wherein a maleic anhydride containing chromogenic impurities is maintained as a molten mass at a temperature above the melting point of maleic anhydride for a period of time long enough to convert chromogenic impurities to by-products whose vapor pressures are substantially different from the vapor pressure of maleic anhydride and thereafter a refined maleic anhydride of a lower color number as compared with the color number of said maleic anhydride prior to the hot-aging treatment is separated from said by-products by fractionation, that improvement which comprises subjecting the molten maleic anhydride containing chromogenic impurities to said hot-aging treatment in the presence of a compound of the group consisting of the oxy acids and oxy acid anhydrides of phosphorus, arsenic and antimony in an amount limited to less than 30% of the maleic anhydride and continuing said hot-aging of the maleic anhydride in the presence of said compound until said refined maleic anhydride separated from said by-products has a color number (Pt-Co scale) lower than that of said first-mentioned maleic anhydride and not substantially higher than 40.

3. In the hot-aging treatment of maleic anhydride wherein a crude maleic anhydride containing chromogenic impurities is maintained as a molten mass at a temperature above the melting point of maleic anhydride for a period of time long enough to convert chromogenic impurities to by-products whose vapor pressures are substantially different from the vapor pressure of maleic anhydride and thereafter a refined maleic anhydride of a lower color number as compared with the color number of said crude maleic anhydride prior to the hot-aging treatment is separated from said by-products by fractionation, that improvement which comprises subjecting a crude maleic anhydride having a color number (Pt-Co scale) substantially higher than 40 to said hot-aging treatment in the presence of ¼% to 30% of a compound of the group consisting of the oxy acids and oxy acid anhydrides of phosphorus, arsenic and antimony, and prolonging the hot-aging of the crude molten maleic anhydride until said refined maleic anhydride separated from said by-products has a color number (Pt-Co scale) not substantially higher than 20.

4. In the hot-aging treatment of maleic anhydride wherein a crude molten mass of maleic anhydride containing chromogenic impurities is maintained at a temperature above the melting point of maleic anhydride for a period of time long enough to convert chromogenic impurities to by-products whose vapor pressures are substantially different from the vapor pressure of maleic anhydride and thereafter a refined maleic anhydride of a lower color number as compared with the color number of said crude maleic anhydride prior to the hot-aging treatment is separated from said by-products by fractionation, that improvement which comprises subjecting a crude maleic anhydride having a color number (Pt-Co scale) substantially higher than 40 to said hot-aging treatment at a temperature of at least about 140° C. but sufficiently low to maintain the bulk of the maleic anhydride in liquid phase and in the presence of ¼% to 10% of a compound of the group consisting of the oxy acids and oxy acid anhydrides of phosphorus, arsenic and antimony until said refined maleic anhydride separated from said by-products has a color number (Pt-Co scale) not substantially higher than 20.

5. In the hot-aging treatment of maleic anhydride wherein a crude molten mass of maleic anhydride containing chromogenic impurities is maintained at a temperature above the melting point of maleic anhydride for a period of time long enough to convert chromogenic impurities to by-products whose vapor pressures are substantially different from the vapor pressure of maleic anhydride and thereafter a refined maleic anhydride of a lower color number as compared with the color number of said crude maleic anhydride prior to the hot-aging treatment is separated from said by-products by fractionation, that improvement which comprises having present in the molten maleic anhydride while it is subjected to said hot-aging treatment phosphorus pentoxide in a limited amount which is less than 30% of the crude maleic anhydride.

6. In the hot-aging treatment of maleic anhydride wherein a crude molten mass of maleic anhydride containing chromogenic impurities is maintained at a temperature above the melting point of maleic anhydride for a period of time long enough to convert chromogenic impurities to by-products whose vapor pressures are substantially different from the vapor pressure of maleic anhydride and thereafter a refined maleic anhydride of a lower color number as compared with the color number of said crude maleic anhydride prior to the hot-aging treatment is separated from said by-products by fractionation, that improvement which comprises subjecting a maleic anhydride having a color number (Pt-Co scale) substantially higher than 40 to said hot-aging treatment in the presence of ¼% to 30% phosphorus pentoxide and prolonging the hot-aging of the crude molten maleic anhydride until said refined maleic anhydride separated from said by-products has a color number (Pt-Co scale) not substantially higher than 20.

7. The method of refining maleic anhydride containing chromogenic impurities which distill in the same temperature range as the maleic anhydride, which comprises maintaining the maleic anhydride as a liquid mass containing a compound of the group consisting of oxy-acids and oxy-acid anhydrides of phosphorus, arsenic, and antimony in an amount limited to less than 30% of the maleic anhydride, at a temperature between about 140° C. and about 200° C. for a period of time of at least three hours which is sufficient to convert such impurities to by-products whose vapor pressure is substantially different from the vapor pressure of maleic anhydride, and separating maleic anhydride from such by-products by fractionation.

8. A method of purifying catalytic maleic anhydride containing chromogenic impurities which distill in the same temperature range as the maleic anhydride, which method comprises adding to the impure maleic anhydride between ¼% and 30% by weight of a compound of the group consisting of oxy-acids and oxy-acid anhydrides of phosphorus, arsenic, and antimony and maintaining said maleic anhydride as a liquid mass containing said compound at a temperature between about 140° C. and about 200° C. for a period of time at least sufficient to convert said impurities to by-products whose volatility is substantially different from that of maleic anhydride, said period of heating being at least 3 hours, and separating maleic anhydride from the resulting by-products by vaporization.

9. A method of purifying crude maleic anhydride of the group consisting of maleic anhydride recovered as such from the reaction gases of the vapor phase catalytic oxidation of organic compounds and maleic anhydride obtained by thermal dehydration of maleic acid recovered from such gases, and containing chromogenic impurities which distill in the same temperature range as the maleic anhydride, which method comprises maintaining the maleic anhydride in liquid phase at a temperature above the melting point of maleic anhydride and in admixture with phosphorus pentoxide in a limited amount which is less than 30% of the maleic anhydride for a period of time at least sufficient to convert said impurities to products having a substantially lower vapor pressure than the aforesaid chromogenic impurities, and distilling off maleic anhydride from said products.

10. A method of purifying crude maleic anhydride of the group consisting of maleic anhydride recovered as such from the reaction gases of the vapor phase catalytic oxidation of organic compounds and maleic anhydride obtained by thermal dehydration of maleic acid recovered from such gases, and containing chromogenic impurities which distill in the same temperature range as the maleic anhydride, which method comprises maintaining the crude molten maleic anhydride at a temperature above its melting point in admixture with phosphorus pentoxide in a limited amount which is less than 30% of the maleic anhydride for a period of time at least sufficient to convert said impurities to products having a substantially lower vapor pressure than the aforesaid chromogenic impurities, and distilling off maleic anhydride from said products.

11. The method of purifying crude maleic anhydride containing chromogenic impurities which distill in the same temperature range as the maleic anhydride, which method comprises maintaining the maleic anhydride as a molten mass in admixture with between ¼% and 10% by weight of phosphorus pentoxide at a temperature between about 140° C. and about 200° C. for a period of time at least sufficient to convert said impurities to products having a substantially lower vapor pressure than the aforesaid chromogenic impurities, and distilling off maleic anhydride from said products.

12. The method of purifying a crude maleic anhydride condensate obtained by fractional condensation of maleic anhydride from hot reaction gases of the vapor phase catalytic oxidation of organic compounds and containing chromogenic impurities which distill from the condensate in the same temperature range as the maleic anhydride, which method comprises treating a molten mass of the maleic anhydride condensate with phosphorus pentoxide in a limited amount which is less than 30% of the maleic anhydride at a temperature between about 140° C. and about 200° C. for a period of time at least sufficient to convert said impurities to products having a substantially lower vapor pressure than the aforesaid chromogenic impurities, and distilling off maleic anhydride from said products.

13. The method of purifying a crude maleic anhydride condensate obtained by fractional condensation of maleic anhydride from hot reaction gases of the vapor phase catalytic oxidation of organic compounds and containing chromogenic impurities which distill from the condensate in the same temperature range as the maleic anhydride, which method comprises treating a molten mass of the maleic anhydride condensate with arsenic trioxide in a limited amount which is less than 30% of the maleic anhydride at a temperature between about 140° C. and about 200° C. for a period of time at least sufficient to convert said impurities to products having a substantially lower vapor pressure than the aforesaid chromogenic impurities, and distilling off maleic anhydride from said products.

14. The method of purifying a crude maleic anhydride condensate obtained by fractional condensation of maleic anhydride from hot reaction gases of the vapor phase catalytic oxidation of organic compounds and containing chromogenic impurities which distill from the condensate in the same temperature range as the maleic anhydride, which method comprises treating a molten mass of the maleic anhydride condensate with between ¼% and 10% of phosphorus pentoxide at a temperature between about 140° C. and about 200° C. for a period of time of at least three hours and sufficient to convert said impurities to products having a substantially lower vapor pressure than the aforesaid chromogenic impurities, and distilling off maleic anhydride from said products.

15. In the manufacture of maleic anhydride from maleic acid obtained by vapor phase catalytic oxidation of organic compounds and containing chromogenic impurities which distill in the same temperature range as maleic anhydride, the improvement which comprises thermally dehydrating the maleic acid to produce maleic anhydride containing the aforesaid chromogenic impurities, treating the maleic anhydride in molten condition with phosphorus pentoxide in a limited amount which is less than 30% of the maleic anhydride at a temperature between about 140° C. and about 200° C. for a period of time at least sufficient to convert said impurities to products having a substantially lower vapor pressure than the aforesaid chromogenic impurities, and distilling off maleic anhydride from said products.

JOYCE H. CROWELL.

CERTIFICATE OF CORRECTION.

Patent No. 2,343,536. March 7, 1944.

JOYCE H. CROWELL

It is hereby certified that error appears in the printed specification of the above numbered patent requiring correction as follows: Page 4, first column, line 46, for "frictionally" read --fractionally--; page 5, first column, in the table, seventh column thereof, for "After 100 days" read --After 110 days--; page 6, second column, line 39, claim 7, for "axy-acid" read --oxy-acid--; and that the said Letters Patent should be read with this correction therein that the same may conform to the record of the case in the Patent Office.

Signed and sealed this 2nd day of May, A. D. 1944.

Leslie Frazer (Seal)                 Acting Commissioner of Patents.